United States Patent [19]
Cesaire et al.

[11] Patent Number: 5,942,738
[45] Date of Patent: Aug. 24, 1999

[54] SMART IC CARD SYSTEM AND SMART IC CARD WITH TRANSACTION MANAGEMENT PROGRAM STORED THEREIN

[75] Inventors: Gerard Cesaire, Ris Orangis; François Devaux, Paris; Yves Gerard, Fontenay le Fleury, all of France

[73] Assignee: SYSECA S.A., Malakoff, France

[21] Appl. No.: 08/952,117

[22] PCT Filed: May 28, 1996

[86] PCT No.: PCT/FR96/00797

§ 371 Date: Nov. 25, 1997

§ 102(e) Date: Nov. 25, 1997

[87] PCT Pub. No.: WO96/38826

PCT Pub. Date: Dec. 5, 1996

[30] Foreign Application Priority Data

May 30, 1995 [FR] France .................................. 95 06371

[51] Int. Cl.⁶ ...................................................... G06K 5/00
[52] U.S. Cl. ......................... 235/380; 235/492; 235/379; 902/26; 340/825.32
[58] Field of Search .................................... 235/380, 492, 235/379; 902/26; 340/825.34, 825.32, 825.36

[56] References Cited

U.S. PATENT DOCUMENTS

| | | | |
|---|---|---|---|
| 5,613,012 | 3/1997 | Hoffman et al. | 235/380 X |
| 5,724,417 | 3/1998 | Bartholomew et al. | 235/380 X |
| 5,830,068 | 11/1998 | Brenner et al. | 463/42 |
| 5,870,724 | 2/1999 | Lawlor et al. | 235/379 X |
| 5,878,141 | 3/1999 | Daly et al. | 235/379 X |
| 5,889,941 | 3/1999 | Tushie et al. | 235/380 X |

FOREIGN PATENT DOCUMENTS 2-268390  11/1990  Japan .

*Primary Examiner*—Michael G. Lee
*Attorney, Agent, or Firm*—Oblon, Spivak, McClelland, Maier & Neustadt, P.C.

[57] ABSTRACT

Smart IC cards are ones which themselves control performance of their transactions, in order to avoid an IC card reader having to be specialized in particular transaction types. A smart IC card system includes at least one IC card reader (1) and an IC card (4) which stores a transaction management program in a memory thereof. The reader (1) controls exchange cycles by alternately and repetitively sending to the IC card (4), on the one hand a request for provision of a packet of instructions and data, this being referred to as the "card message" and, on the other hand, a report declaration associated with a report message regarding the execution by the reader (1) of instructions previously received in card messages. The IC card (4) controls processing cycles synchronous with exchange cycles by virtue of a device for executing a transaction management program, developing instructions and data of the card messages at a rate of card-message provision requests and report declarations sent by the reader (1).

5 Claims, 1 Drawing Sheet

SMART IC CARD SYSTEM AND SMART IC CARD WITH TRANSACTION MANAGEMENT PROGRAM STORED THEREIN

BACKGROUND OF THE INVENTION

1. Field of the Invention

The term IC card is used to denote cards, generally with the size of a credit card, but alternatively tokens, which are provided with an electronic microcircuit based on memories and a microcontroller designed to make it possible to perform a transaction, for example a financial or medical transaction.

The present invention relates to a system which is formed by an IC card and an IC card reader which makes it possible to execute the transaction for which the IC card is intended.

2. Discussion of the Background

Known systems having an IC card and reader include, on the one hand, IC cards which are provided with memories and possibly a microcontroller and are used merely as a data medium supplemented by security means and, on the other hand, IC card readers which are intelligent enough to control the performance of the transaction in question.

IC card readers are equipped with a system which provides a link to an IC card, either by means of a multipin electrical connector, or by means of a capacitive or inductive antenna. They may be self-contained and work on their own, or transparent and used to access a computer system. When they are self-contained, they have communication elements which are sufficient to allow an individual to monitor the steps of a transaction: keyboard and display which, like the link to the IC card, are managed by the reader's own microcontroller which has an application program specific to the transaction in question. When they are transparent, they behave as a simple input/output port, dedicated to an IC card, for a computer system programmed especially for the transaction in question. In both cases, they transmit instructions to the IC card, which are set in a form which accords with a specific exchange protocol, often the one defined in standard ISO 7816-3, and the IC card merely executes these instructions and gives the report.

The intelligence of the transaction lies either in the reader or in the computer system associated with the reader. The drawback of this is the need for specialization of the reader, or the associated computer system, according to the type of transaction. Thus, if the type of transaction needs to be changed, it is not enough to change the programming of the IC card. It is also necessary to change the programming of the reader, if it is self-contained, or the programming of the associated computer system, if the reader is a transparent one. This constitutes an obstacle to the development of IC card applications.

To overcome this drawback, it has been proposed to shift the intelligence, that is to say the management of the transaction, to the IC card itself, which then stores the transaction management program in its memory and executes it.

The reader then becomes an external component whose main function is to provide the resources needed for carrying out the transaction and, in particular, to provide the IC card with interfaces such as a keyboard, display, asynchronous link and means for connecting to another IC card or to a computer system.

The problem then arises of supplying the reader with certain instructions to be carried out in relation to the transaction management program which is stored in a memory in the IC card and is run by it.

In order to solve this problem, it is known, for example from European Patent Application EP-A-0,490,455, to define a communication protocol between an IC card and an IC card reader using a small number of specific commands for certain actions asked of the reader by an IC card, and requests and responses on the part of the reader which are compatible with these commands, having fairly general characteristics in order to suit various types of IC cards and readers. However, this solution has the drawback of limiting the possibilities and nature of the exchange between an IC card and its reader to a fairly narrow framework due to the specificity of the commands, requests and responses. It also has the drawback of no longer making it possible to adhere to the existing standards regarding the management of communications between an IC card and an IC card reader, and consequently of being incompatible with the previous generation of IC cards.

SUMMARY OF THE INVENTION

The object of the present invention is to provide a communication protocol between a smart IC card and an IC reader which places the least possible limitation on the exchanges between an IC card and its reader, in order to avoid specialization of the IC card reader in a particular type of IC card, this protocol being easy to make compatible with existing standards regarding the management of communications between an IC card and its reader.

It relates to a system for smart IC cards, including at least one IC card reader provided with IC card supply means which are activated by the connection of an IC card, and an IC card which stores a transaction management program in its memory. This system is noteworthy in that the IC card reader includes:

means which alternately and repetitively generate, for the purpose of being sent to a connected IC card, on the one hand a request for provision of a packet of instructions and data developed in the said IC card, this being referred to as the "card message" and, on the other hand, a report declaration associated with a report message regarding the execution by the reader of instructions previously received in card messages from the said IC card, the report declaration and the report message being referred to as the "reader report", means for receiving and processing the card message delivered by the said IC card subsequent to a request to provide a card message, and means for developing and transmitting reader report messages subsequent to execution of instructions received from the said IC card in card messages, and in that the said IC card includes:

initialization means which are activated when the said IC card is powered up and cause the said reader to be provided with a first card message, means for recognizing a card-message provision request originating from the said reader and for transmitting a card message to the said reader in response to such a card-message provision request, means for recognizing a report declaration and for processing the associated report message coming from the said reader, and means for executing the said transaction management program, developing the instructions and data of the card messages at the rate of the card-message provision requests and the report declarations sent by the said reader.

Advantageously, a card-message provision request originating from the IC card reader consists of a command, of the "get response" type, normally used in standards ISO 7816/prEN726 to send prepared data to the reader, while a report declaration originating from the reader consists of a command, of the "envelope" or "execute" type, normally used in standards ISO 7816/prEN726 to send data or have a program executed in an IC card.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
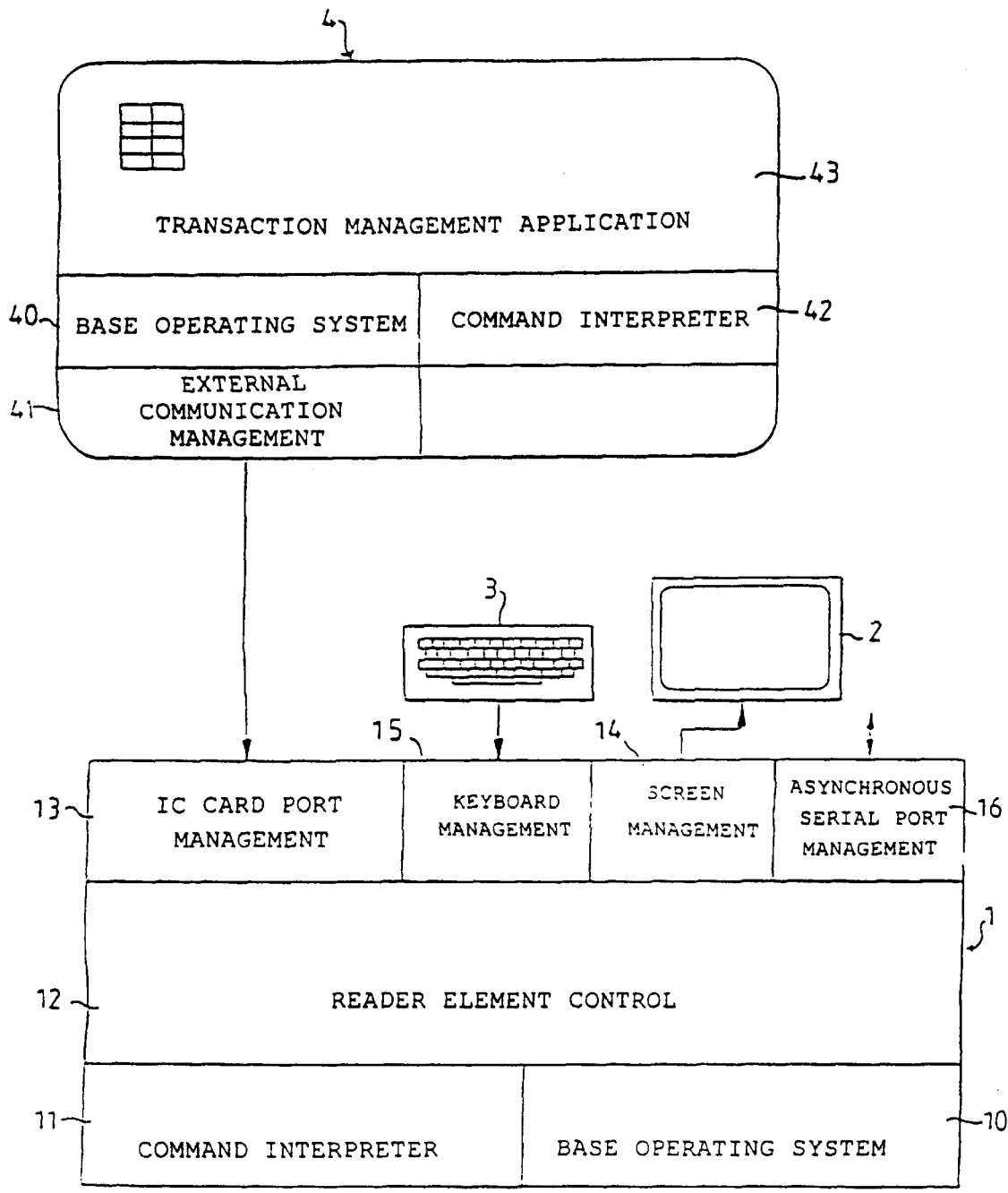
FIG. 1 is a block diagram of the smart IC card system according to the present invention.

Other characteristics and advantages of the invention will emerge from the following description of an embodiment of the invention, which is given by way of example. This description will be given with reference to the drawing, in which FIG. 1 schematically illustrates the various logic levels of the programs of a smart IC card and of the associated reader of a system according to the invention.

FIG. 1 shows the broad partitions of the management programs of the microcontrollers of an IC card reader 1 equipped with a display screen 2 and a keyboard 3, and of a smart IC card 4.

For the reader 1, the lowest level of its operating program is a base operating system 10, in executable code, which is designed for the type of microcontroller and manages its memory. This base operating system 10 is associated with a command interpreter 11 which recognizes the various high-level language instructions which a card message may contain. On top of this combination there is an intermediate level consisting of a control program 12 which oversees the various elements of the reader, and an outer level consisting of various peripheral management programs, including a program 13 for managing communication with an IC card according to standard ISO 7816-3, a program 14 for display screen management, a program 15 for keyboard management and a program 16 for asynchronous serial port management for a possible link to a remote computer system. The control program 12 directs the commands originating from the card messages to the command interpreter 11, constructs the report messages intended for the IC card, develops the succession of card-message provision requests and report declarations intended for the IC card, and interfaces with the base operating system and the various peripheral management programs.

For the smart IC card 4, the lowest level of its operating program is again a base operating system 40, in executable code, which is designed for the type of microcontroller and manages its memory, with the usual security systems for an IC card, and an external communication protocol 41. This base operating system 40 is associated with a command interpreter 42 which is resident in ROM and recognizes the high-level language commands. On top of the combination of the base operating system 40 and command interpreter 41 there is an outer level consisting of a high-level language program 43 for managing the transaction for which the IC card is intended, this program being stored in EEPROM memory.

The reader 1 communicates with the smart IC card 4 by means of an alternate two-way link, using a succession of cycles of two successive commands from standards ISO 7816/prEN726, namely the "get response" command and the "envelope" or "execute" command.

The "get response" command consists of sending the binary message comprising five successive one-byte fields:
  a first field, denoted "CLA", containing a byte identifying the class of the instruction, for example instructions reserved for financial applications,
  a second field, denoted "INS", containing the byte C0 in hexadecimal, identifying the "get response" command type,
  a third reserved field, denoted "P1", containing the byte 00 in hexadecimal,
  a fourth reserved field, denoted "P2", containing the byte 00 in hexadecimal,
  a fifth field, denoted "Le field", containing a byte whose value n corresponds to the number of bytes expected in response from the IC card.

This "get response" command prompts a so-called "Data field" response from the IC card, containing n data bytes, n being the number declared in its "Le field", and two bytes "SW1, SW2", giving a card report.

The "execute" command consists in sending the binary message consisting of five successive one-byte fields and a final multi-byte data field:
  a first field, denoted "CLA", containing a byte identifying the class of the instruction, for example instructions reserved for financial applications,
  a second field, denoted "INS", containing the byte AE in hexadecimal, identifying the "execute" command type,
  a third reserved field, denoted "P1", containing the byte 00 in hexadecimal,
  a fourth reserved field, denoted "P2", containing the byte 00 in hexadecimal,
  a fifth field, denoted "Lc field", containing a byte whose value n corresponds to the number of bytes in the message accompanying the "execute" command, and
  a sixth, final field, denoted "Data field", containing the n data bytes announced in the fifth field "Lc field". This "execute" command prompts a response from the IC card with two bytes "SW1, SW2", giving a card report.

The "envelope" command has the same structure as the "execute" command and differs from it by the value of the byte of its second field "INS" identifying the command which has the value C2 in hexadecimal.

In these three messages, the respective fields "Le field" and "Lc field" declare the length of the expected card message, or the length of the report message from the reader, which are used to carry the instructions to be executed and associated data coming from the IC card and, in return, the reports of the actions executed by the reader, as well as resulting data.

When the IC card 4 is inserted into the reader 1, the IC card is detected and powered up by the reader 1, which sends it an answer to reset according to standard ISO 7816-3. This results in a process of initializing the microcontroller of the IC card 4, which ends with an answer to reset being sent to the reader 1 from the IC card 4, and with a start-up of the transaction management program of the IC card 4 for a first processing cycle which, in this card, leads to the preparation of the first card message which it will be possible to communicate to the reader 1 as soon as the latter has asked for it by means of a message provision request in the form of a "get response" command.

On receipt of the acceptance response to the answer to reset, the reader 1 embarks upon a first cycle of data exchange with the IC card 4.

During this first exchange cycle, the reader 1 sends the IC card 4 a message provision request in the form of a "get response" command, in order to request the sending of the card message prepared by the IC card 4 after its initialization.

On receipt of such a request through the "get response" command, the IC card 4 sends the prepared card message to the reader 1.

The reader 1 receives the card message, identifies the data which it contains, interprets the message, executes the requested commands and responds to the IC card 4 by a report declaration in the form of an "envelope" or "execute" command, with a report message telling the IC card 4 how it has performed what was asked of it, and the result of this processing. This completes the first exchange cycle.

On receipt of the "envelope" or "execute" command for the first exchange cycle coming from the reader 1, the IC card 4 continues to run its transaction management program in a second processing cycle, during which it firstly checks for correct execution of the card message which it has just sent, using the report message, then prepares another card message.

The reader 1 then embarks upon a second exchange cycle by sending a second "get response" command to the IC card 4 in order to read the new card message. After processing the data of this new card message, the reader 1 reports its execution to the IC card 4, by means of a report message incorporated with a second "envelope" or "execute" command, which concludes the second exchange cycle.

On receipt of this second "envelope" or "execute" command coming from the reader 1, the IC card 4 then, still under the control of its transaction management program, embarks upon a third processing cycle, during which it checks for correct execution of the card message which it has just sent, by means of the report message received from the reader 1, then prepares another card message.

The reader 1 then embarks upon a third exchange cycle by sending a third "get response" command to the IC card 4 in order to receive this card message.

The processing cycles, instigated by the IC card 4, and exchange cycles, instigated by the reader 1, thus succeed one another according to the transaction management program stored in the IC card 4.

According to standard ISO 7816-3, the reader 1 is in control of the exchanges in electrical terms, but the transaction runs at the instigation of the IC card 4, which is a smart card.

In the case when the system includes several IC cards, only one card at a time runs the transaction. The IC card running the transaction is referred to as "active". The others are referred to as "passive". The first IC card capable of answering a "get response" instruction from the reader is the one declared active.

As mentioned above, the "get response" command is used by the reader to ask the IC card which has been declared "active" for the types of operation which it is to perform during a transaction.

There are quite a wide variety of types of operation which an active IC card can ask for from the reader. Examples of these include:

a request to configure the reader, to which the reader returns a report summarizing its main characteristics, a stop/restart of the reader, to which the reader returns a report giving its operating state, installing a program into the reader, using call parameters contained in card messages, for example: name of the program, length and content of the program. In reply to this installation, the reader returns a report on its status and the data of the installation carried out.

executing an installed program using call parameters contained in card messages, for example: name of the program, length of the data, call data of the program. In reply to this execution, the reader returns a report on its status and the length of the data in return.

a request to open/close an asynchronous link, by means of call parameters contained in card messages, for example: port number, correspondent identifier, direction. In reply to this request, the reader returns a report on the status and the number of the port in question.

a request to display an operator message, by means of call parameters contained in card messages, for example: type of message (permanent, outstanding, etc.), type of display (steady, flashing, etc.), number of elements in the message, co-ordinates of each element in the message, length of the label, label. In reply to this request, the reader returns a status report.

a request for selection from a menu, by means of call parameters contained in card messages, for example: type of menu, number of lines in the menu, name of the line, co-ordinates of each of the selections, label. In reply to this request, the reader returns a report indicating the number of the selected line.

a request to enter in a grid, by means of call parameters contained in card messages, for example: name of the grid, type of the grid (initial, concatenation, etc.), number of questions, co-ordinates of the label of each question, co-ordinate of each response, maximum number of characters to be entered, type of field (entry obligatory, not displayed, not modifiable, etc.), length of the label of the question, label of the question, number of characters of the default value of the response, default value of the response (omitted if the length is zero). In reply to this request, the reader returns a report including either:

the name of the grid, the number of a question and a request for complementary action or an entered value, an abort, the name of the grid, a validation, the date and time, writing to a file of the reader, by means of call parameters contained in card messages, for example: file name, address in the file, length of the data to be written and the actual data to be written. In reply to this request, the reader returns a report giving the status and the file name.

a request for external authentication with, in return, a report giving proof of the validity of the reader, exchange of ciphered/deciphered data, by means of call parameters contained in card messages, for example: length of the ciphered/deciphered data and the ciphered/deciphered data, with a report in return from the reader giving the key number, the length of the data and the data themselves, a file signature request, by means of call parameters contained in card messages, for example: the name of the file, with a report in return from the reader giving the requested signature, a request to execute a command for a passive IC card, by means of call parameters contained in card messages, which consist of commands in the passive card format according to standard ISO 7816-4, with a report in return giving a status, the length of the data in return and the data in return, a request to execute a "standard" command of the reader, by means of call parameters contained in card messages, with a reader report.

The term "standard" reader command means any command which the operating system of the reader can execute. "Standard" commands comprise, in particular:

a request to create/delete a directory in the memory of the reader, a request to select a directory from the memory of the reader, a request to read the content of a directory of the reader, a request to create/delete files in the current directory of the reader, a request to copy/back-up/restore files of the reader to a communication port (IC card or asynchronous), a request to run an executable file, the installation of a program in the reader application from a reader file, a print request if the reader is equipped with or connected to a printer, a date and time request, etc.

Furthermore, the reader may itself signal certain external events:

request for connection of an asynchronous link (no. of the port, identifier of the requester), insertion of a card (no. of the inserted card, ATR), withdrawal of a card (no. of the extracted card), keyboard inactivity, etc.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for smart IC cards, including:

at least one IC card reader provided with IC card supply means which are activated by connection of an IC card thereto; and an IC card which stores a transaction management program in a memory provided therein;

wherein said IC card reader, includes, means which alternately and repetitively generate, for purpose of being sent to a connected IC card, a request for a provision of a packet of instructions and data developed in said IC card, said request referred to as a card message, and a report declaration associated with a report message regarding execution by said IC card reader of instructions previously received in card messages from said IC card, said report declaration and report message referred to as a reader report, means for receiving and processing said card message delivered by said IC card subsequent to a request to provide a card message, and means for developing and transmitting said reader report subsequent to execution of instructions received from said IC card in said card messages;

said IC card, includes, initialization means which are activated when said IC card is powered up and which cause said IC card reader to be provided with a first card message, means for recognizing a card-message provision request originating from said IC card reader and for transmitting a card message to said IC card reader in response to said card-message provision request, means for recognizing a report declaration and for processing the associated report message coming from said IC card reader, and means for executing said transaction management program, developing instructions and data of said card messages at a rate of card-message provision requests and report declarations sent by said IC card reader.

2. The system of claim 1, wherein said means for executing said transaction management program develop instructions for:

a request to display a message intended for an operator, a request to select a menu, a request to enter a grid, a request to display a grid or a field, a request to execute a command by said card message receiving and processing means of said IC card reader, a request to record a file, a request for external authentication, a request for ciphering, a request for deciphering, a request for a file signature, a request to install a program, and a request to execute a previously installed program.

3. The system of claim 1, wherein said means for developing a report message of said IC card reader develop report messages regarding:

a menu selection, a field entry, a response to a request to execute a command by said card-message receiving and processing means of said IC card reader, an insertion of said IC card into said IC card reader, a withdrawal of said IC card from said IC card reader, inactivity of a keyboard, authentication of said IC card reader, an install report, and a request for an asynchronous link.

4. The system of claim 1, wherein said alternately and repetitively generate means of said IC card reader develops said card-message provision request in a form of a digital sequence having a plurality of successive fields, including a command identification field and a field for declaring a length of an expected card message.

5. The system of claim 1, wherein said alternately and repetitively generate means of said IC card reader develops a report declaration in a form of a digital sequence having a plurality of successive fields, including a command identification field and a field for declaring a length of the associated report message.

* * * * *